United States Patent [19]

Leber et al.

[11] Patent Number: 4,784,675

[45] Date of Patent: Nov. 15, 1988

[54] CABINET CONTROLLER

[75] Inventors: Leland C. Leber, Fort Collins; Charles L. Hunter, Loveland, both of Colo.; George N. Brown, Jr., Lexington, Va.

[73] Assignees: Teledyne Industries, Inc., Fort Collins, Colo.; Westvaco Corporation, New York, N.Y.

[21] Appl. No.: 177,171

[22] Filed: Apr. 4, 1988

Related U.S. Application Data

[63] Continuation of Ser. No. 902,864, Sep. 2, 1986, abandoned.

[51] Int. Cl.⁴ .................. B01D 46/46; B01D 50/00
[52] U.S. Cl. ......................................... 55/213; 55/217; 55/270; 55/274; 55/316; 55/472; 55/485; 55/385.1
[58] Field of Search ................. 55/210, 212, 213, 217, 55/270, 274, 385 R, 385 E, 467, 471, 472, 478, 482, 485, 481; 98/1, 1.5

[56] References Cited

U.S. PATENT DOCUMENTS

| | | | |
|---|---|---|---|
| 2,789,660 | 4/1957 | Brown | 55/213 |
| 2,922,489 | 1/1960 | Hollingsworth | 55/217 |
| 3,080,695 | 3/1963 | Hay | 55/471 X |
| 3,364,838 | 1/1968 | Bradley | 55/472 X |
| 3,518,814 | 7/1970 | Maynard | 55/210 |
| 3,812,370 | 5/1974 | LaViolette | 55/274 X |
| 3,936,284 | 2/1976 | Mason | 55/274 |
| 4,050,291 | 9/1977 | Nelson | 55/270 X |
| 4,332,679 | 6/1982 | Hengst et al. | 55/270 X |
| 4,350,504 | 9/1982 | Diachuk | 55/274 X |
| 4,491,458 | 1/1985 | Sunter | 55/274 X |
| 4,534,776 | 8/1985 | Mammel et al. | 55/385 R X |
| 4,627,860 | 12/1986 | Rowland | 55/270 X |
| 4,642,128 | 2/1987 | Solorzano | 55/274 X |
| 4,655,049 | 4/1987 | Andrews et al. | 55/213 X |
| 4,659,349 | 4/1987 | Rodi et al. | 55/471 X |

FOREIGN PATENT DOCUMENTS

| | | | |
|---|---|---|---|
| 2432333 | 4/1980 | France | 55/210 |
| 210422 | 12/1983 | Japan | 55/274 |
| 183052 | 9/1985 | Japan | 55/270 |

Primary Examiner—Kathleen J. Prunner
Attorney, Agent, or Firm—Hugh H. Drake

[57] ABSTRACT

A controller is associated with a cabinet which contains apparatus and components for performing operations or conducting processes. Associated with the cabinet is a housing within which is contained an air filtration material. Air is admitted and propelled for flow through that material and delivery into the confined space defined by the cabinet by a blower unit. The blower unit is controlled in response to the rate of flow of air through the housing in order to maintain a selected rate of flow in compensation for changes in impedence to flow of air through the material. Operation also is controlled in response to other parameters, such as pressure differential across the material, pressure differential across a prefilter upstream, a measure of the rate of air flow into the cabinet, ambient temperature within the cabinet, pressure differential between outside atmospheric pressure and each of the housing and the cabinet and relative humidity within the cabinet. Those operating parameters are continually analyzed with the results being used for control and/or record keeping.

15 Claims, 5 Drawing Sheets

CABINET CONTROLLER

This is a continuation of application Ser. No. 902,864 filed Sept. 2, 1986, now abandoned.

The present invention relates to a cabinet controller. More particularly, it pertains to a system for governing the environment within a confined space which contains equipment or apparatus and components for performing operations or conducting processes.

The need for control of various parameters, such as humidity, temperature and air purity within a space, whether a small cabinet or a large room, has long been recognized for various operations. It also is desirable to log a continuing record of variations in different parameters within or affecting an environmental control system. Such information can be of aid to technical personnel who seek to solve or prevent problems that may affect overall operation.

One example of such need arises with respect to control systems and other electronic equipment for use in process plants. For certain industries, such as pulp and paper mills and chemical processing plants, the environment is hostile to electronic equipment. Detrimental effects may occur by reason of the existence of relatively high levels of contaminants such as hydrogen sulfide, sulfur dioxide and free chlorine as well as others. Similar detriment has been observed in connection with electrical and electronic equipment such as that employed in telephone switching apparatus. Especially in urban situations, exposure of the equipment to such chemical pollutants can lead to comparatively rapid degradation of performance.

Accordingly, in an effort to minimize degradation of such systems and equipment, the apparatus typically is located in one or more metal cabinets located at various sites within such facilities. Particularly for stabilizing the environment and accommodating heat dissipation of electrical and electronic systems within those enclosures, cooled and dehumidified air is delivered into their interiors. At least usually, the air also is filtered to remove contaminants. In an overall operation, the functioning of the system for supplying filtered air may need to accommodate the results obtained by the functioning of the associated system for controlling humidity and temperature.

In connection with air filtering itself, much has been done. For example, one might refer to U.S. Pat. Nos. 4,474,739, 4,521,530 and 4,459,269.

Even the use of an enhanced air filtration material can lead to less than most efficient use, for the fundamental reason that there are a host of parameters of concern. These include rate of flow of the air, pressure differentials, temperatures, humidity and ambient values. In addition, the performance of the air filtration system tends to change during use.

Accordingly, it is a general object of the present invention to afford a better approach to the resolution of problems which exist.

Another object of the present invention is to provide a new and improved air supply system which monitors incoming clean air flow rate and controls an air mover to provide a selected flow rate over the life of incorporated filter elements.

A further object of the present invention is to monitor both the filter system itself and the host cabinet or other space in terms of one or more such factors as humidity, temperature, pressure and performance as well as service requirements.

Another object of the present invention is to provide a data record of key parameters in a manner to enable recovery of data for use by operators or service personnel.

In accordance with one aspect of the present invention, there is a housing within which is contained an air filtration material. Air is admitted for flow through that material and delivery into a confined space. Included within the housing are propelling means for moving that air through the material. Preferably associated with the housing are means for controlling the propelling means in response to the rate of flow of the air through the housing in order to maintain a selected rate of such flow in compensation for changes in impedance to flow of air through the material. Operation also is controlled or monitored in response to other parameters, such as pressure differential across the material, pressure differential across a prefilter upstream within the air flow, a measure of the rate of air flow delivered from the housing, ambient temperature within the space being supplied, pressure differential between that interior as well as the housing and outside atmospheric pressure and relative humidity within the space being supplied.

Other features include the analysis of operative parameters within the aforementioned space as well as within the housing together with the enablement of feedback resulting from the analysis and used as input to the controlling means, all lfor governing rate of air flow and/or record keeping.

The features of the present invention which are believed to be patentable are set forth with particularity in the appended claims. The organization and manner of operation of the invention, together with further objects and advantages thereof, may best be understood by reference to the following description of a specific embodiment of the invention as taken in connection with the accompanying drawings, in the several figures of which like reference numerals identify like elements and in which:

An equipment cabinet 10 includes a door 12 tightly sealable to the cabinet. Mounted on a sidewall of cabinet 10 is a combined dehumidifier and cooler 14. Except for the fact that the operation of unit 14 will affect certain parameters within cabinet 10 here of concern, unit 14 may be considered to be conventional for its purposes and needs no detailed description.

Figure 1:
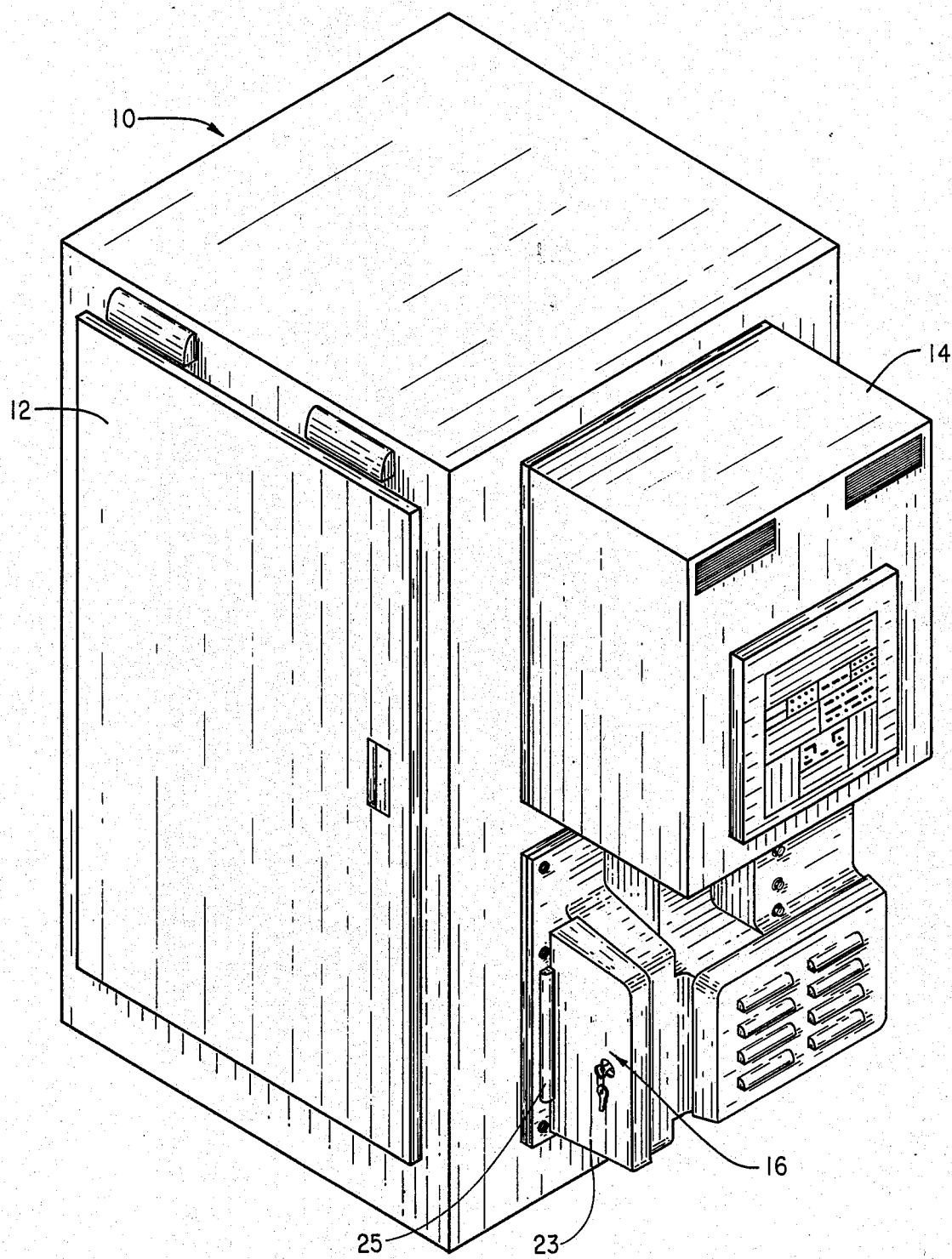
FIG. 1 is an isometric view of an equipment cabinet with which other components are associated.
Figure 2:
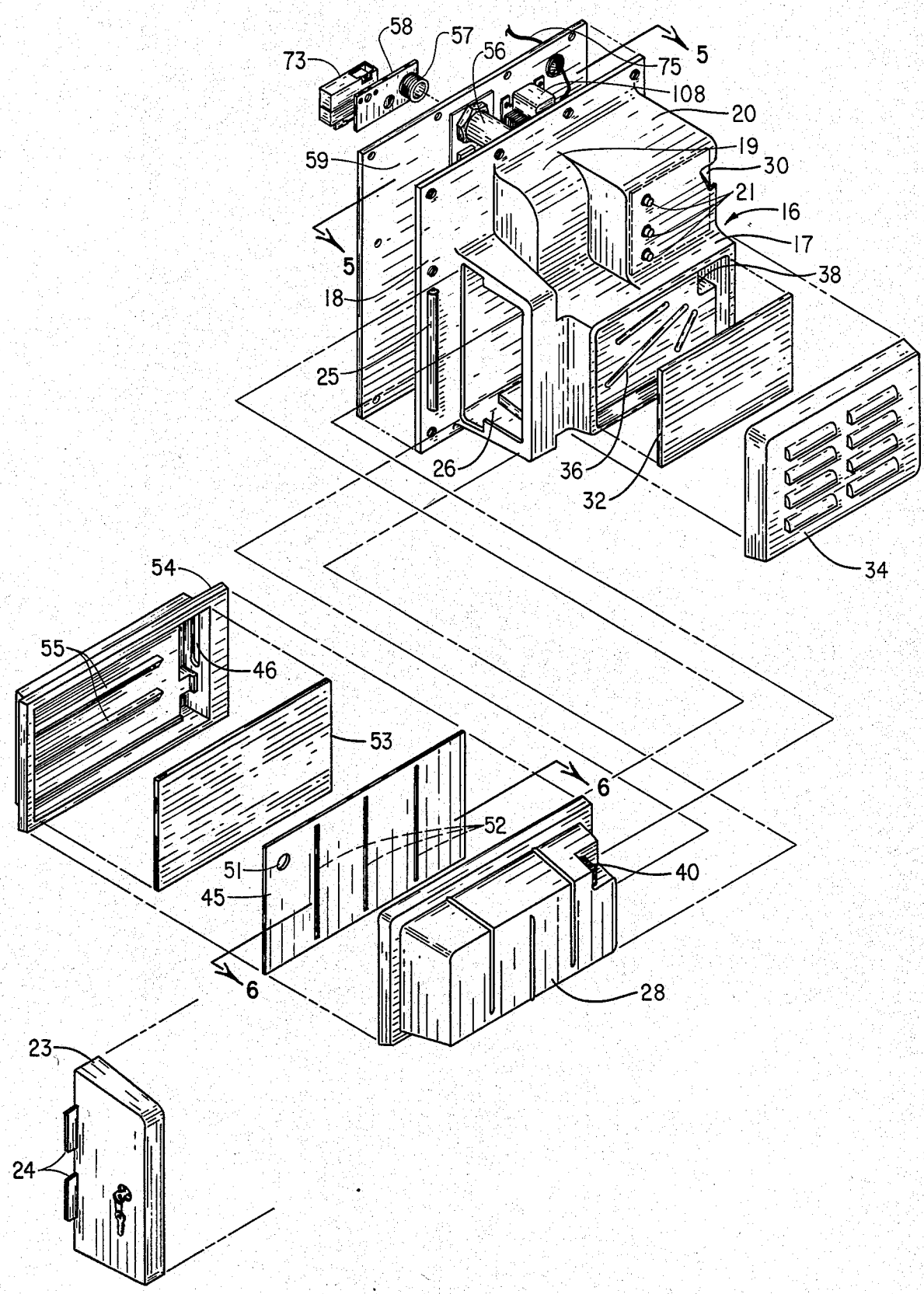
FIG. 2 is an exploded isometric view of an assembly shown in FIG. 1.
Figure 5:
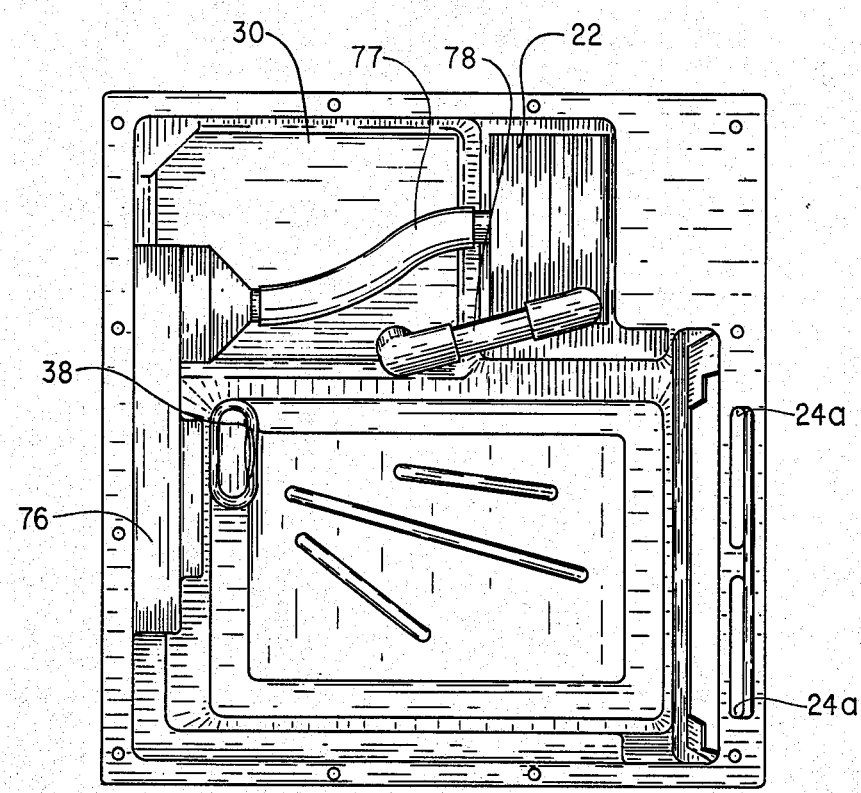
FIG. 5 is a plan view taken along line 5—5 in FIG. 2.

Also mounted on a sidewall of cabinet 10 is a cabinet controller or air filter system 16 for controllably inletting airfrom the external atmosphere into the interior of cabinet 10. From FIGS. 2 and 5, it will be observed that controller 16 includes a housing 17 having a flange 18 and shaped to define a compartment 19 within which is housed a motor-driven centrifugal blower unit. Compartment 19 opens into a console 20 which accommodates control components and from which indicator lights 21 project as shown. Blower unit 22 is visible in FIG. 5. An openable, and preferably lockable, door 23 forms one endwall of housing 17. Door 23 has a pair of tabs 24 insertable through respective openings 24a to seat hingedly behind a cleat 25 permitting access to an interior space 26.

A canister 28 is slideably received and seated within space 26 and interiorly contains an air filtration material such as carbon particles. In principle, raw carbon granules may be used as the filtering material within canister 28. To enhance filtering action, however, a "treated" carbon preferably is used. Examples include the well known approach of activating the carbon as well as including one or more catalytic or chemical agents as described in the patents mentioned in the introduction. Whatever mode of enhancement of filtering capability of the material is employed, that feature, in itself, is not of essence to that hereinunder described because the control principles being presented are applicable to a variety of different filtration materials.

Mounted within console 20 is a circuit board 30 which carries the typical array of electronic components, arranged and interconnected to constitute a programmed microprocessor data storage, decision-making and motor control. Unless otherwise noted later, the components employed on or associated with board 30 are those which are termed off-the-shelf items.

Recessed within the outer wall of housing 17 is a prefilter 32. Preferably, the latter is covered by a louvered closure 34. In this case, filter 32 is composed of a pad of polyester fibers pressed together into flexible sheet form. The purpose of filter 32 is to trap coarse airborne particles such as dust. Embossed in the bottom of the recess in housing 17 are a plurality of ribs 36 which space the filter outwardly from that recess bottom and allow air to be drawn through effectively the entire surface of filter 32 for delivery into an inlet opening 38 in the bottom of the recess.

Figure 6:
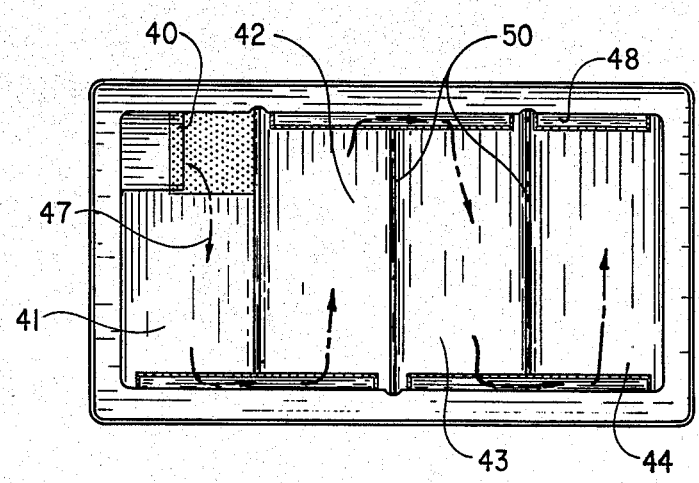
FIG. 6 is a plan view taken along line 6—6 in FIG. 2.

Canister 28 has its own inlet opening 40 which, upon insertion, sealingly mates with opening 38. Opening 40 leads into the first of, in this case, four separate filter material compartments 41, 42, 43 and 44 within the interior of canister 28, each loaded with the filter material and all closed by a cover 45. All are interconnected through screened entrances and exits to constitute a maze through which the air flows to a canister outlet 46 on the same end of canister 28 as inlet 40. The airflow paths are indicated by dash-dot arrows 47 in FIG. 6, with one final exit being into a plenum 48.

Cover 45 is sealed atop the upper edge surfaces around each of compartments 41-44 as at 50. An opening 51 in cover 45 is positioned over plenum 48. Seated over several ribs 52, distributed across the outer surface of cover 45, is a postfilter 53. Filter 53, is a polyester sheet which exhibits an efficiency of particulate removal of over 95 percent and preferably about 99 percent. In use, it serves primarily to trap carbon or other "fines" of the particulate filtration material.

Overlying these different components of canister 28 is a shell 54 which includes outlet 46 and has a series of ribs 55 distributed to press against filter 53. The sheet material of filter 53 is sealed around its edge margin into shell 54. In turn, shell 54 is bonded around its edge margin to the facing margin of canister 28. The assembly is sealed together sufficiently well to exhibit no leakage. Thus, the air delivered through prefilter 32 flows through openings 38 and 40, meanders through the filtration material in compartments 41-44 into plenum 48 and then through opening 51 for distributed flow through postfilter 53. From the latter, the air is led to outlet 46.

Shell 54, filter 53 and cover 45 may be sealingly clamped together in completing the assembly of canister 28. Considering relevant costs of labor and material, however, it presently is preferred to bond shell 54 and cover 45 into place after compartments 41-44 have been filled with the filtration material. In either case, it is preferred that compartments 41-44 be completely filled when loading the filtration material.

The air delivered from outlet 46 and through blower 22 creates a positive pressure within housing 17 from which the air is metered into host cabinet 10 through a delivery tube 56 and a nipple 57 that projects from a plate 58 secured to a closure wall 59 affixed to flange 18 of housing 17. Preferably, a sealing gasket (not shown) of elastomeric material is sealed between wall 59 and the facing surface of cabinet 10. Blower 22 creates a positive pressure within housing 17 in order to draw the air from inlet 38 through all of the different filtering elements as well as to develop a positive pressure within host cabinet 10 relative to the external atmosphere. Interior positive pressure ensures that only filtered air ends up within cabinet 10, since any leaks in the overall system will be back to the surrounding atmosphere, the only incoming atmospheric air being by way of prefilter 32 and through the filtering material within canister 28. The air flow through housing 17 also removes heat dissipated from the contained electrical components.

Figure 3:
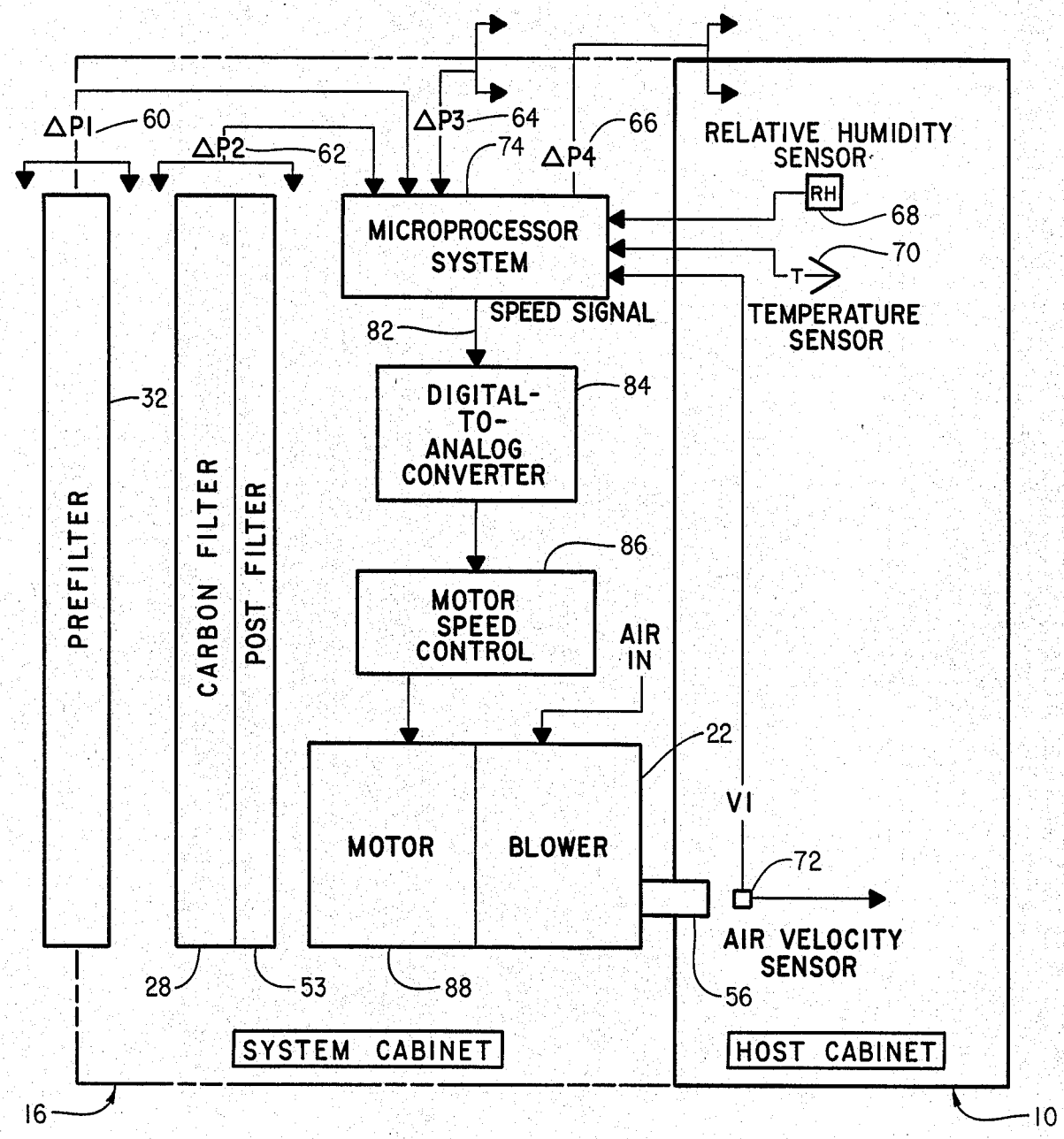
FIG. 3 is a block diagram showing system aspects of associated components depicted in FIG. 1.

With reference to FIG. 3, a first pressure sensor 60 determines the pressure differential $\Delta P1$ across prefilter 32. A sensor 62 determines the pressure differential $\Delta P2$ across the combination of the carbon filter within canister 28 and postfilter 53. In practice, sensor 62 may be eliminated as a separate element, since a determination of filter-flow impedence is available from the other sensors that enable comparison as between the exterior and the interior of housing 17 and the air flow into the host cabinet. Another sensor 64 is situated to determine the pressure differential $\Delta P3$ between housing 17 and the external ambient pressure. Similarly determining the pressure differential $\Delta P4$, as between host cabinet 10 and that of the external ambient, is a pressure sensor 66.

Additional sensors located within or at the entrance to host cabinet 10 include a relative humidity sensor 68, a temperature sensor 70 and an air velocity sensor 72. Sensor 72 is located within tube 56 and enables a determination of the air velocity ultimately delivered into the interior of cabinet 10. Sensors 66, 68 and 70 conveniently are located within a module 73 secured to plate 58.

In principle, the humidity sensor and the several pressure sensors may be analog devices the output signals of which are fed to analog-to-digital converters for supplying digital signals to a microprocessor system 74. System 74 may then be programmed to respond as desired to the differential values so represented. For present purposes, however, it is sufficient to supply system 74 with signals that indicate only that humidity and each of given pressure differentials are above or below a preselected level.

In the preferred specific embodiment, therefore, flexible tubing in each case leads from an appropriate location to a pressure-responsive electrical switch mounted in a convenient position and connected by wires to system 74. For clarity in the drawings, and because their installation is routine, that tubing and those wires as well as wires from humidity sensor 68 have been omitted from the drawings except for the example of a tube 75 which leads to sensor 66 located within host cabinet 10.

In this case, again for example, ambient surrounding atmospheric pressure is sensed by a tube which leads through the end wall opposite door 23. The pressure just beyond prefilter 32 is sensed within outlet 38. That beyond postfilter 53 and blower 22, within housing 17, is determined within console 20. Tee-fittings interconnect the tubes to common points, such as between prefilter 32 and canister 28 and for sensing the external ambient.

Air from outlet 46 is coupled into a manifold 76 and from there is drawn through a hose 77 by blower 22. Upon pressurized delivery from blower 22, the air is delivered by a hose 78 for deflection against the inward facing surface of circuit board 30.

The different signals all serve as inputs to microprocessor system 74, the single significant output of which is a blower-motor speed-control signal as indicated at 82. Signal 82, being digital, is converted to analog format in a converter 84 for application to a motor-speed control 86 which supplies power to a blower motor 88, as well as providing an input to the memory addressable by the printer. In an alternative, not shown, a feedback signal, in the form of a frequency-representative signal representative of motor speed, may be fed through a converter which translates that signal into a voltage fed to control 86. However, that feedback becomes unnecessary when, as preferred, motor 88 exhibits a stable and reproducible voltage-speed characteristic. Blower 22, driven by motor 88, pressurizes housing 17 in order to cause air to be delivered through tube 56 into cabinet 10 at a velocity detected by sensor 72.

Figure 4:
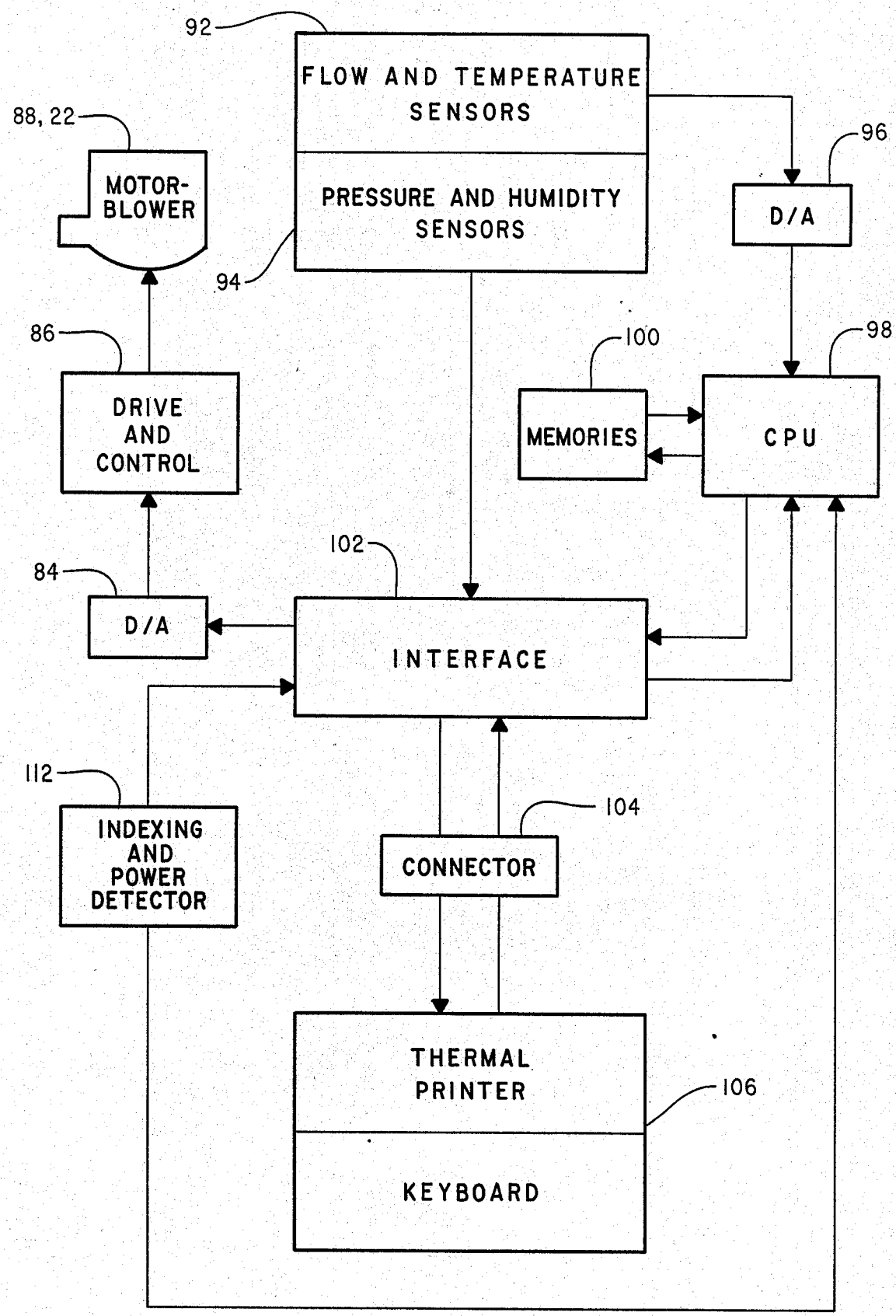
FIG. 4 is another block diagram useful in explanation of the system aspects.

Another way of examining the system aspects involves reference to FIG. 4. Here, flow-rate and temperature sensors 70 and 72 are indicated at 92, in this case illustrated along with the pressure and humidity sensors at 94. The analog air flow rate and temperature information is fed through an analog-to-digital converter 96 to a central processing unit 98 which, of course, has its memories 100. The memories in that unit 100 include a random access memory (RAM), a read only memory (ROM) and a non-volatile random access memory. As conventional, memory unit 100 feeds information to and receives information from CPU 98. The pressure and humidity sensor information is sent to an interface 102 which, through a connector 104, intercouples in both directions with a thermal printer and keyboard apparatus 106.

Speed control information from interface 102 is also fed through digital-to-analog converter 84 into control 86 which is a drive and control system that powers motor 88. It is contemplated that a conventional sixty Hertz power supply be employed for all power, that supply providing a twenty-four volt source for the blower motor, one five-volt primary source for most of the electronics and a separate five-volt power source for the non-volatile random access memory. A main power transformer 108 is, in this case, mounted on the inside surface of closure wall 59.

Also preferably included is an indexing and power detection system 112. Again, this is routine. It involves indexing by counting zero crossings of the AC waveform in order to create counting information which is fed through interface 102 to CPU 98. It also easily serves to detect loss of power, so as to enable all operation to shut down until power is restored or at least to provide a warning to an operator.

Blower 22, in this specific embodiment, nominally provides the delivery of air at ten cubic feet per minute (CFM) of filtered air. As indicated, the air is ducted through the filter cabinet to help cool the electronics components on circuit board 30, with the air then escaping through tube 56 into host cabinet 10. Tube 56 serves as a controlled dimension orifice which establishes enough back pressure to keep housing 17 pressurized.

Airflow rate sensing is here accomplished by using an analog air velocity sensor located in tube 56. For use of the same controller with a host cabinet of different dimensions or where leakage of air from that host cabinet may differ, so that sensor 66 within the host cabinet might indicate a different level of pressurization, CPU 98 preferably also is programmed to step to a higher flow rate automatically or under option elected by the user through switch actuation.

During power energization, the system, by means of detector 112, includes what might be called a self-check mode in order to determine that normal operation has been established. The system will shut itself down in the event that the pressure within housing 17 is below a set minimum. At the same time, a printed error message will be fed to the data logger function of microprocessor 74 and the printer in apparatus 106. Preferably, the programming of CPU 98 in such that, in the event of a shut down effected by the overall microprocessor system, there will be an attempt at restart every fifteen minutes with a recheck at that point of all parameters. The system can also be restarted through the data logger formed by the combination of unit 106 and the non-volatile random access memory. Herein, a signal from indexing or zero crossing detector 112 is utilized to monitor both running time and elasped time.

In this particular embodiment, the pressure drop across prefilter 32 is selected to be two inches of water, while the pressure in the host cabinet as well as within housing 16 is selected to be 0.08 inch of water. This corresponds with operation to maintain the temperature within host cabinet 10 at a maximum of 130° F. with a relative humidity within that cabinet of sixty percent. Operation above these values is recorded.

Desirably, one of indicator lights 21 is illuminated to signal that the pressure drop through prefilter 32 is excessive, meaning it should be changed. A second one of lights 21 indicates that service is needed, as when there is a failure in circuitry or the pressure drop as determined by sensor 62 is excessive. The latter warns that a change of the principal filter appears to be needed. The remaining one of lights 21 is a power-on indicator.

The prefilter and canister indicators desirably also are used to inform service personnel that the controller has less than one minute to go before attempting to restart. That occurs after initiating a restart from the data logger keyboard, with both indicators flashing at, say, a two second repetition rate until ten seconds remain before restart, at which time those indicators remain energized.

The elapsed time of parametric excursions beyond the specified limits are recorded in non-volatile memory and may be made available even to a hand-held thermal printer which is detachable from the system by means of a connector not shown but in this case mounted just inside door 23. Preferably, all sensors are polled at one minute intervals, and excursions beyond specification will be integrated to the nearest minute.

Of course, such parameters as have been described for the embodied system are only exemplary of one application. For different applications, it is only a matter of routine engineering to alter switch levels set and/or the software placed within the read only memory of microprocessor system 74 to change the different reference values. Of special interest is the air velocity control system, using the microprocessor to monitor and interpret the output from a preferably solid-state air velocity sensor in order to provide a reference voltage level to the motor speed control circuit by way of a digital-to-analog converter. Microprocessor system 74 uses the host cabinet air temperature and air flow data to adjust blower motor speed. In this case, any additional temperature sensing as well as the information with regard to pressures and relative humidity serve only as information to CPU 98 for programming control. Logging is basically that of determining how long each parameter exceeds a predetermined value. That information is retained by the processor for later printout to be used, for example, by service personnel. In a given environment, it also may be desirable to sense and log the external ambient temperature information or program instruction.

Actually, the air velocity measurement system is in this case an analog sensor of the temperature delivered into host cabinet 10 through outlet 56. It might be called a solid-state equivalent of a hot-wire anemometer. It has been found that a measurement of the flowing air temperature may be calibrated to reveal the air velocity. Of course, that calibration becomes a routine part of the programming of microprocessor system 74. The latter uses a stored look-up table to yield the rate of air flow which, in turn, adjusts motor speed control. However, an actual anemometer type of air velocity sensor could be employed.

Thus, it will be seen that a filter system has been developed which not only monitors and controls its own operation to deliver filtered air but records variables within the host cabinet such as relative humidity and temperature. At the same time, it also adjusts its own operation to take into account not only pressure differential between its own interior and the exterior but also pressure differential between the interior of the host cabinet supplied with air as compared with the exterior ambient.

Those parameters not immediately used for blower speed control are logged. This enables service personnel to key in adjustments in the basic blower speed control program. Thus, air flow rate ends up being controlled not only with respect to the operation of the filtering system but also with respect to parameters within the environment to which the filtered air is fed as well as the relationship of both the filtering system and the host environment to external ambient conditions.

The inclusion of non-volatile random access memory enables significant enhancement of capability and governing of proper performance. In itself, it provides memory retention of parameter records in the event of power loss. It also serves to store the serial number of the controller to assist external record keeping and for security purposes.

As a related feature, operation of the non-volatile random access memory also is monitored. Such a device has a useful life over only a determinable maximum number of store cycles, typically about ten-thousand. As embodied, the read only memory is programmed so that microprocessor 74 effects a cumulative count of those store cycles and sets a flag when that count reaches a value near the maximum and selected in correspondence with the scheduled frequency of service printouts by the operator or technician. When the flag appears on the printout, the need for replacement of the device thus is signalled.

The cost of operation is small in terms of the electricity demanded for control operation and even for operation of motor 88 which drives the blower. Those figures turn out to be comparatively insignificant when compared to the cost of the primary filter material within canister 28. Accordingly, a primary benefit resides in optimizing the effective life of the main filter material itself. This is achieved by adjusting air flow volume through that main filter material rather exactly to just that required to accomplish its intended purpose.

Perhaps most importantly, the air flow rate is enabled to be constant notwithstanding the ever-present gradual reduction in air flow capacity or the increase in air flow impedance presented by the filter with continued usage. The end result is to ensure that the removal efficiency of the active filter material remains at a constantly high efficiency over the life of that material's effectiveness. Therefore, filter life is extended at the same time as filter efficiency is retained throughout the extent of that filter life.

While a particular embodiment of the invention has been shown and described, and certain alternatives have been mentioned, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:

1. An air-filtering system comprising:
   a cabinet defining a confined interior equipment-containing space into which said air is admitted and maintained at a positive pressure relative to ambient atmospheric pressure external to said cabinet;
   a housing having an inlet for admitting air into said housing from the ambient atmosphere external to said housing and having outlet means for delivering air from said housing into said equipment-containing space within said cabinet;
   a canister having its own outlet opening and its own inlet opening and disposed within said housing, said canister containing an air filtration material located between said canister inlet opening and said canister outlet opening with said canister being in a position to enable air flow between said canister openings through said material;
   propelling means disposed within said housing and so located in position relative to said canister as to move the air from said housing inlet in a downstream direction through said canister inlet opening, said filtration material and said canister outlet opening on through said housing outlet and into said equipment-containing space;
   means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

said propelling means being located downstream of said air flow through said material;

and means for disposing said controlling means downstream from said propelling means directly in the path of said air flowing from said propelling means and ultimately toward said housing outlet.

2. An air-filtering system comprising: a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

and, in addition to said controlling means, means to sense pressure differential across said material for enabling said controlling means to respond to said pressure differential.

3. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

a prefilter upstream of said air flow through said material;

and, in addition to said controlling means, means to detect pressure differential across only said prefilter for enabling said controlling means to respond to said pressure differential.

4. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

a post filter downstream of said air flow through said material, said controlling means including a measurer of the rate of said air flow from said post filter, and with said controlling means responding to said measurer by adjusting said propelling means.

5. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

a post filter downstream of said air flow through said material with said propelling means also being located downstream of said air flow from said material.

6. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

and an element for sensing the temperature of said air flow from said housing delivered into said space with said controlling means responding to said element by recording the values of said temperature.

7. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

and a device for sensing the ambient temperature within the interior of said space with said controlling means responding to said device by providing a monitoring of said ambient temperature.

8. An air-filtering system comprising:

a cabinet defining a confined interior equipment-containing space into which said air is admitted and maintained at a positive pressure relative to ambient atmopsheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

and a determinator of pressure differential between the interior of said space and the ambient atmosphere from which said air is admitted through said housing inlet, with said controlling means responding to said determinator by enabling response to said differential.

9. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

and a unit for sensing the relative humidity within said space, with said controlling means responding to said unit by enabling the monitoring of said humidity.

10. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

means for analyzing operative parameters within said space and within said housing;

means for enabling feedback from said analyzing means to be fed to said controlling means;

and mans associated with said controlling means for maintaining said constant rate of said air flow.

11. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

and means including said controlling means for enabling said air flow through said filter material to govern at least one of the humidity, temperature and pressure within said space and for determining one or more of status, performance and service necessity.

12. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

means for logging parameters of operation within said system;

means responsive to said logging means for producing information indicative of said parameters;

and means for retrieving said information.

13. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space wtihin said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

means for sensing at least one of the humidity, temperature, pressure and rate of air flow parameters within said housing;

a non-volatile random access memory included within said controlling means for retaining a record of said one parameter;

means included within said controlling means for cumulatively counting the number of store cycles performed by said memory;

and means responsive to said counting means for setting a flag when the count of said store cycles reaches a predetermined value.

14. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmosphere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

said filtration material being adsorbtive of gaseous products and said rate of air flow being selected to maximize life of said filter by minimizing said rate of air flow through said material to no more than said constant rate.

15. An air-filtering system comprising:

a cabinet defining a confined interior equipment-containing space into which said air is admitted and maintained at a positive pressure relative to ambient atmospheric pressure external to said cabinet;

a housing having an inlet for admitting air into said housing from the ambient atmopshere external to said housing and having outlet means for delivering air from said housing into said equipment-containing space within said cabinet;

a canister having its own outlet opening and its own inlet opening and disposed within said housing, said canister containing an air filtration material located between said canister inlet opening and said canister outlet opening with said canister being in a position to enable air flow between said canister openings through said material;

propelling means disposed within said housing and so located in position relative to said canister as to move the air from said housing inlet in a downstream direction through said canister inlet opening, said filtration material and said canister outlet opening on through said housing outlet and into said equipment-containing space;

means located within said air filtering system for controlling said propelling means in response to the flow of said air through said housing in order to maintain essentially continuously a selected constant rate of air flow through said housing outlet and into said cabinet in compensation for changes in impedance of said material to air flow through said material;

a sensor within said controlling means for obtaining a measurement of the rate of air flow through said housing outlet entering to said cabinet;

and means included within said controlling means for periodically polling said sensor in determining the measurement response obtained thereby.

* * * * *